United States Patent [19]

Artzberger

[11] 3,967,337
[45] July 6, 1976

[54] RETURN TO DOCK LEVEL MECHANISM FOR A DOCKBOARD

[75] Inventor: Thomas G. Artzberger, Menomonee Falls, Wis.

[73] Assignee: Kelley Company, Inc., Milwaukee, Wis.

[22] Filed: Mar. 25, 1975

[21] Appl. No.: 561,972

[52] U.S. Cl. ................................. 14/71.7
[51] Int. Cl.² ......................................... B65G 11/00
[58] Field of Search .................... 14/71 R, 7i M, 72

[56] References Cited
UNITED STATES PATENTS

| | | | |
|---|---|---|---|
| 3,117,332 | 1/1964 | Kelly | 14/71 |
| 3,323,158 | 6/1967 | Loomis | 14/71 |
| 3,411,168 | 11/1968 | Hecker | 14/71 |
| 3,454,974 | 7/1969 | Kumpolt | 14/71 |
| 3,475,778 | 11/1969 | Merrick | 14/71 |
| 3,500,486 | 3/1970 | Le Clear | 14/71 |
| 3,662,416 | 5/1972 | Brooks | 14/71 |
| 3,671,990 | 6/1972 | Hovestad | 14/71 |
| 3,699,601 | 10/1972 | Hecker | 14/71 |
| 3,728,753 | 4/1973 | Beckwith | 14/71 |
| 3,786,530 | 1/1974 | Le Clear | 14/71 |

*Primary Examiner*—Nile C. Byers
*Attorney, Agent, or Firm*—Andrus, Sceales, Starke & Sawall

[57] ABSTRACT

A return-to-dock-level mechanism for a dockboard. The dockboard includes a ramp which is hinged at its rear edge to a loading dock and a lip is hinged to the front edge of the ramp and can be pivoted from a downwardly hanging pendant position to an extended position flush with the ramp surface. The ramp is adapted to be moved from the horizontal cross traffic position to an upwardly inclined position by a counterbalancing spring assembly, and a uni-directional holddown mechanism will prevent upward movement of the ramp unless manually released through operation of a cable. An operating link is supported by the ramp and has one end attached to the holddown cable. When the ramp is walked down to a below dock level position with the lip extended, the link is moved to a latched position. After loading is completed and the truck pulls away from the dock, the lip will fall to its pendant position and the downward movement of the lip is transmitted to the link to pivot the link and release the holddown mechanism to cause the ramp to be elevated through the counterbalancing spring assembly. As the ramp is elevated to dock level, the link is unlatched to release the pull on the holddown cable and prevent further upward movement of the ramp.

17 Claims, 7 Drawing Figures

RETURN TO DOCK LEVEL MECHANISM FOR A DOCKBOARD

BACKGROUND OF THE INVENTION

An adjustable dockboard, as shown in U.S. Pat. 3,117,332, includes a ramp having its rear end hinged to a dock. The ramp is biased upwardly to an inclined position by a counterbalancing spring assembly and a manual releasable holddown device holds the ramp against elevation. Hinged to the front edge of the ramp is an extension lip which is adapted to swing from a pendant position, in which the lip hangs downwardly from the front edge of the ramp, to an elevated position in which the lip forms an extension to the ramp. The lip, when in the extended position, is adapted to engage the bed of a truck or carrier and bridge the gap between the ramp and the truck bed to enable material handling equipment to move between the dock and the truck.

In the dockboard, as disclosed in U.S. Pat. 3,117,332, the extension lip is automatically raised to its elevated position by the lip lifting and latching mechanism which is actuated by upward movement of the ramp when the holddown mechanism is released. In the pending U.S. patent application, Ser. No. 532,501 filed Dec. 13, 1974, the lip, instead of being raised to its elevated position as a consequence of upward movement of the ramp, is moved to its extended position as a consequence of downward movement of the ramp from the elevated position towards the cross traffic position. In either case, the engagement of the lip with the bed of the truck releases the weight of the lip from the lip latching mechanism, thereby releasing the lip latching mechanism, so that when the truck pulls away from the dock, the lip will automatically return to its pendant position.

If the ramp is below dock level when the truck pulls away from the dock, the ramp will remain at this downwardly inclined position unless the holddown mechanism is manually released to enable the counterbalancing spring assembly to raise the ramp. With the ramp elevated, the operator will then walk downwardly on the ramp until the ramp returns to its cross traffic position.

Occasionally, the operator may not carry out this procedure to return the ramp to dock level position with the result that the ramp remains in the downwardly inclined position. With the ramp in this below dock level position, it can provide an obstruction to material handling equipment moving over the dock.

U.S. Pat. 3,699,601 discloses a dockboard having a mechanism which will automatically return the ramp to a dock level position if the ramp is at a below dock level position when the truck pulls away from the dock. In that patent, control pawls are connected to the lip lifting mechanism and act to release the holddown mechanism as the lip pivots downwardly from the extended position towards the pendant position when the ramp is below dock level. Release of the holddown mechanism enables the counterbalancing spring assembly to pivot the ramp upwardly to the dock level position.

SUMMARY OF THE INVENTION

The invention relates to an improved return-to-dock-level mechanism to be utilized with an upwardly biased adjustable dockboard. The dockboard includes a ramp hinged at its rear edge to the loading dock and a lip is hinged to the front edge of the ramp and is movable between a downwardly hanging pendant position and an outwardly extending postion where the lip forms an extension to the ramp.

The ramp is counterbalanced or biased to an upwardly inclined position by a counterbalancing spring assembly, and a uni-directional, releasible holddown mechanism serves to prevent upward movement of the ramp while permitting free downward movement of the ramp.

The return-to-dock level mechanism includes an operating link which is pivotally supported by the ramp and one end of the link is connected to the operating chain for the holddown mechanism. When the truck bed is at a below dock level position and the ramp is walked down by the operator to engage the extended lip with the truck bed, the operating link will be moved to a latched position in which the opposite end of the link is latched to the supporting frame.

After the loading operation is completed and the truck pulls away from the dock, the lip will fall by gravity toward the pendant positon, and the downward movement of the lip is transmitted to the link to pivot the link with respect to the supporting frame and exert a pull on the holddown chain in a direction to release the holddown mechanism, thereby causing the ramp to move upwardly. As the ramp is elevated to a dock level position, the link is unlatched to thereby release the pull on the holddown chain and lock the ramp against further upward movement.

The mechanism of the invention automatically returns the dockboard to a dock level position when the lip pivots downwardly toward the pendant position and the ramp is below dock level. This insures that the ramp will be at the horizontal, cross traffic position after the loading operation is completed and eliminates any interference with cross traffic movement on the dock by virtue of the ramp being at a below dock level position.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

Figures 1, 3:
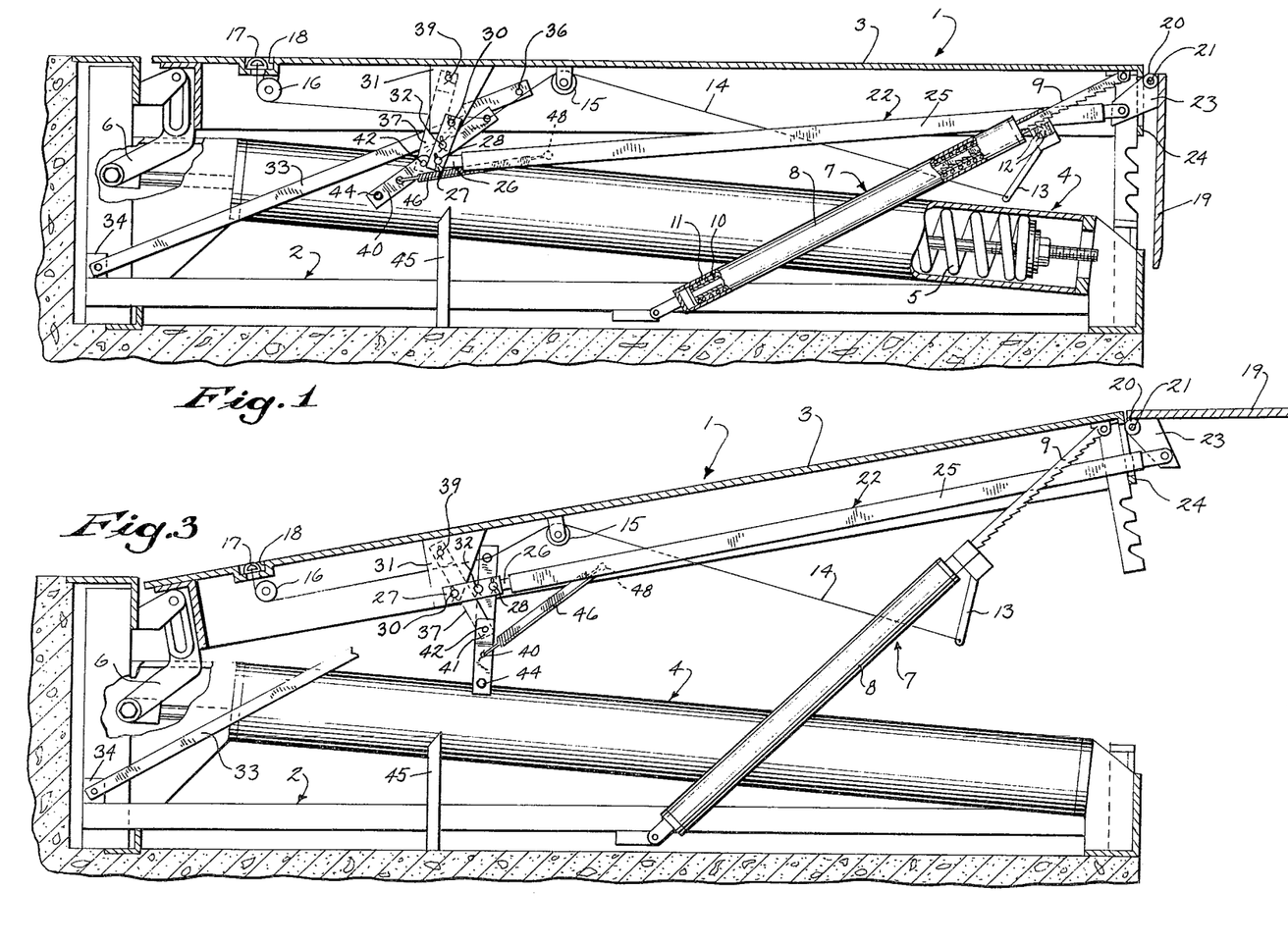
FIG. 1 is a side elevation of a dockboard incorporating the return-to-dock level mechanism of the invention with the ramp in the horizontal cross traffic position.
FIG. 3 is a view similar to FIG. 1, showing the ramp as being walked down with the lip being moved to the extended position.
Figure 2:
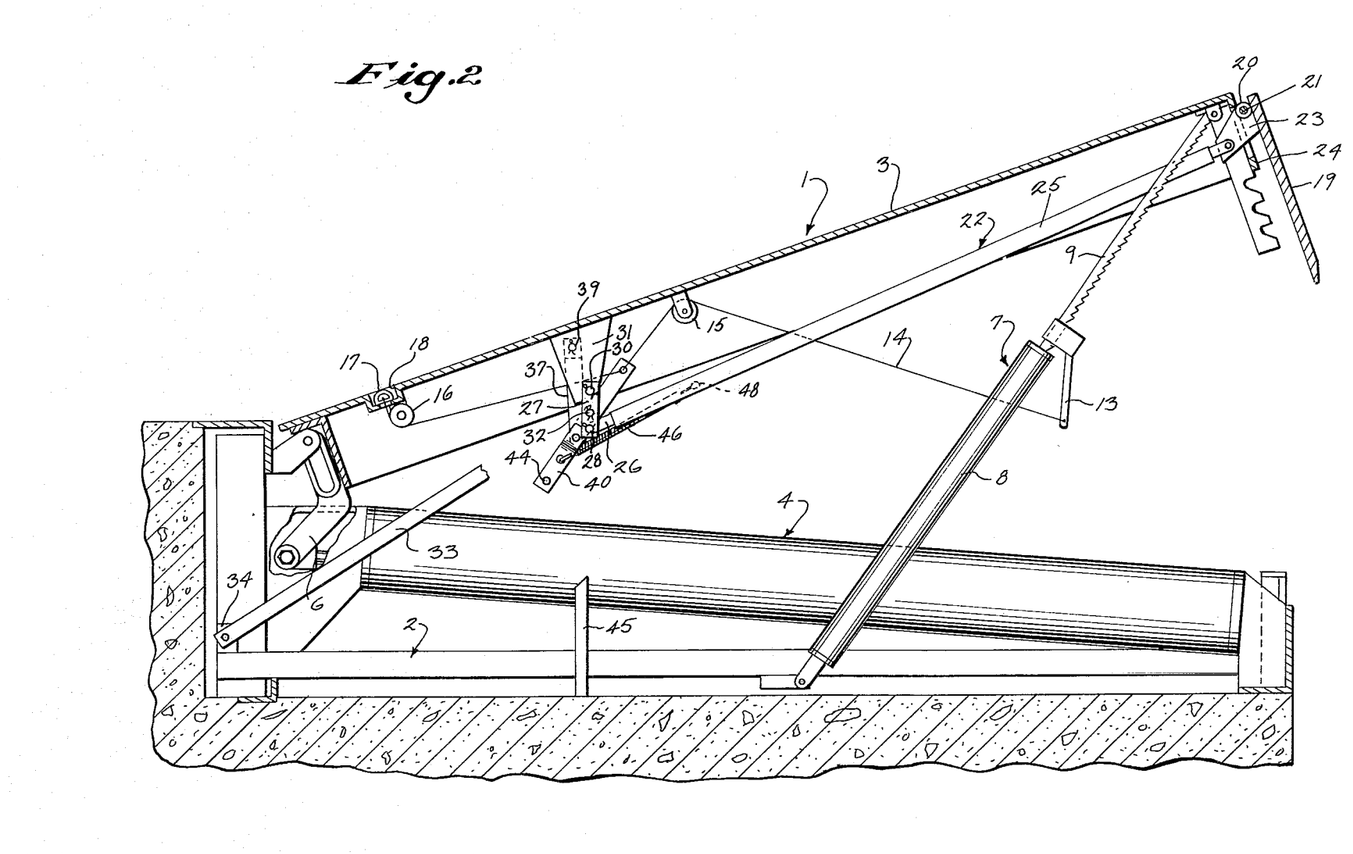
FIG. 2 is a view similar to FIG. 1, showing the ramp in the elevated position and the lip in the pendant position.

The drawings illustrate a dockboard 1 which is adapted to be mounted in a pit or depression in a loading dock. The dockboard 1 includes a frame 2 or supporting structure and a ramp 2 is hinged at its rear edge to the frame. The ramp is adapted to be biased upwardly to an inclined position by a spring assembly 4, such as that disclosed in U.S. Pat. 3,528,118. The spring assembly, as shown in FIG. 1, includes a coil spring 5 that is connected to a lever arm 6 secured to the rear edge of the ramp and the force of the spring acts to move the lever arm 6 forwardly to thereby urge the ramp to the upwardly inclined position, as shown in FIG. 2.

The ramp can be held in any desired position by means of a holddown mechanism 7, as disclosed in U.S. Pat. 3,646,627. The holddown mechanism is a unidirectional device which prevents the upward movement of the ramp unless released, while permitting free downward movement of the ramp. More specifically, the holddown mechanism 7 includes a cylindrical housing 8 which is pivotally connected at its lower end to the supporting structure. As illustrated in FIG. 1, a rack 9 is pivoted to the forward portion of the ramp and is mounted for sliding movement within a tube 10 that is mounted centrally within the housing 8. A spring 11 surrounds the tube 10 and bears between the upper end of the housing 8 and a disc secured to the lower end of the tube 10. A pair of pawls 12 are adapted to engage the teeth of the rack 9 and serve to prevent upward movement of the rack and ramp 3, while permitting free downward movement of the rack and ramp.

The pawls 12, as disclosed in U.S. Pat. 3,646,627, are biased into engagement with the teeth of the rack 9, and the pawls can be moved to the unlocked position through operation of an arm 13 which is pivoted by a chain 14 attached to the outer end of the arm. Chain 14 passes over pulleys 15 and 16 which are mounted on the ramp, and the end of the chain carries a pull loop 17 which is positioned within a well 18 formed in the ramp. By pulling upwardly on the loop 17, the arm 13 will be pivoted to the rear to thereby release the pawls 12 from engagement with the rack 9 and permit the spring assembly 4 to elevate the ramp 3.

The float spring 11 comes into play during unloading of the truck and allows the ramp to rise or float upwardly with the rising truck bed as the load is removed from the truck.

Hinged to the forward edge of the ramp is an extension lip 19. The lip 19 and ramp 3 carry aligned hinge tubes 20 which receive a hinge pin 21. With this hinged connection, the lip can be pivoted from a downwardly hanging pendant position, as shown in FIG. 1, to an extended position in which the ramp forms an extension to the upper surface of the ramp, as shown in FIG. 3. Engagement of the rear edge of the lip 19 with the forward surface of the ramp 3 prevents the lip from moving beyond the extended position in which it is generally flush with the ramp.

The lip is moved from the pendant position to the extended position by a lip lifting mechanism 22 which operates in consequence of the ramp being walked down from the upwardly inclined position, as shown in FIG. 2, toward the horizontal or cross traffic position. The lip lifting mechanism 22 is similar to that described in copending U.S. patent application Ser. No. 532,501 filed Dec. 13, 1974, and includes a lip lifting lug 23 which is pivoted to the hinge pin 21 and extends rearwardly through an opening in the header 24 of the ramp 3. The forward surface of the lug 23 is adapted to engage the underside of the lip, and as the lug is pivoted forwardly, the lip will be pivoted toward its extended position.

Figure 6:
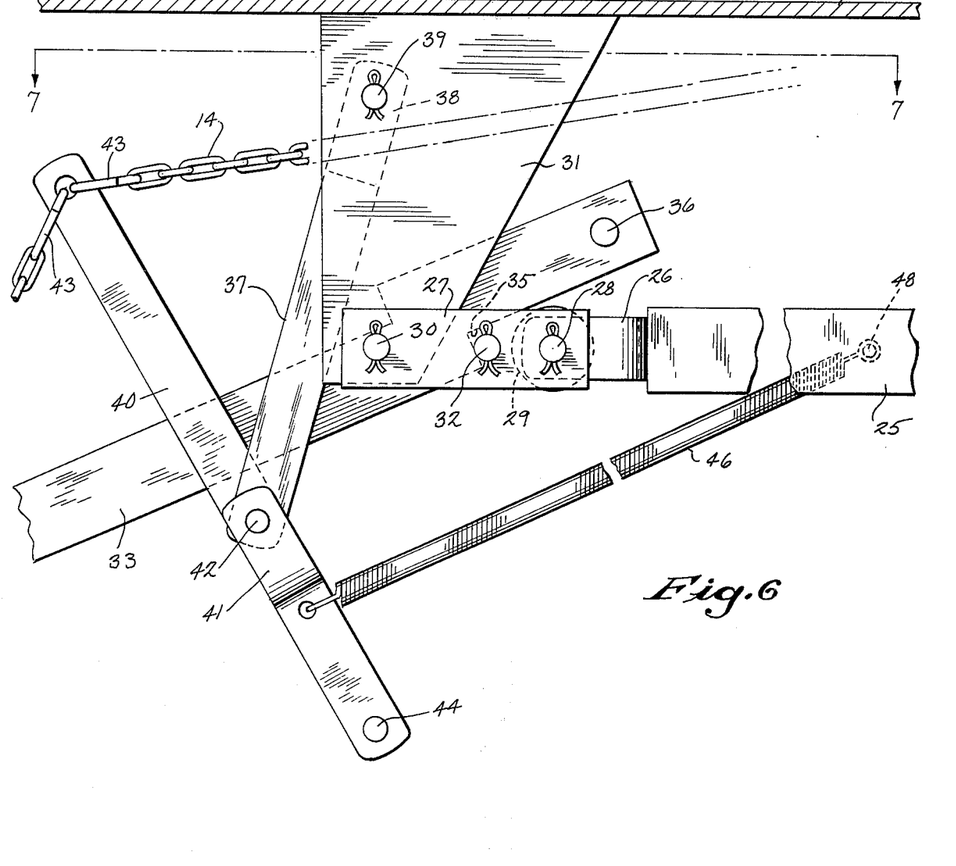
FIG. 6 is an enlarged side elevation of the return to dock level mechanism.
Figure 7:
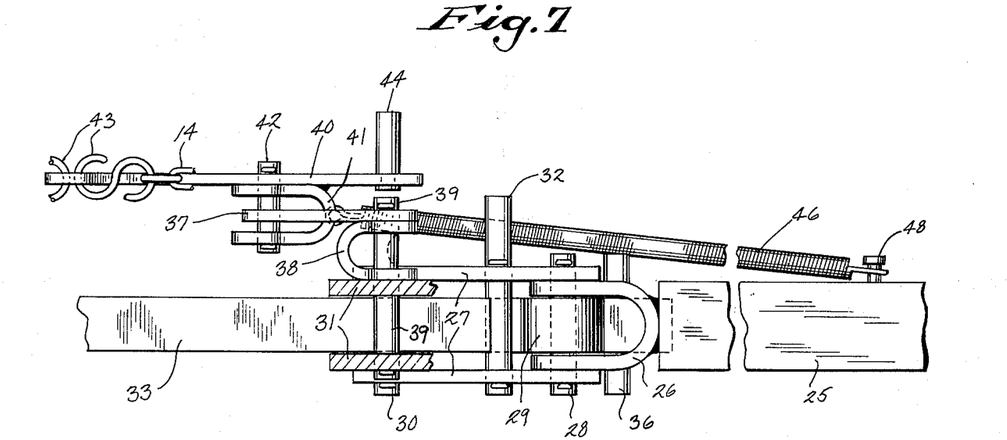
FIG. 7 is a view taken along line 7—7 of FIG. 6.

Lug 23 is pivoted to the forward end of a rod 25 and the rear end of the rod carries a clevis 26 which pivotally connected to a pair of links 27 through a pin 28. As best shown in FIGS. 6 and 7, a roller 29 is located between the links 27 and is journalled on the pin 28. The opposite ends of the links 27 are pivoted by pin 30 to brackets 31 which are fixed to the ramp and extend downwardly from the deck plate of the ramp. The links 27 and rods 25 constitute a toggle mechanism.

A latch pin 32 is secured within aligned openings in the links 27 and is located between the pins 28 and 30.

As described in the aforementioned patent application, as the ramp is moved upward to the inclined position through operation of the spring assembly 4, the links 27 will be latched to the supporting frame through operation of a latch bar 33. With the links latched to the frame 2, downward movement of the ramp toward the horizontal position will cause the links 27 to pivot forwardly, thereby moving rod 25 forwardly and raising the lip 19. The rear end of the latch bar 33 is pivotally connected to lugs 34 which are mounted on the supporting structure or frame 2, while the forward portion of the latch bar 33 extends between the links 27 and rides on the latch pin 32. As shown in FIG. 6, the lower surface of the latch bar 33 is provided with a notch 35, and engagement of the notch with the latch pin 32 will interconnect the frame 2 and links 27 causing the links to pivot forwardly about the pin 30 as the ramp is moved downwardly relative to the latch bar.

Extending laterally from the sides of the latch bar 33 is a pin 36, and the forward edges of the brackets 31 will engage the ends of the pin 36 to limit the upward movement of the ramp with respect to the supporting structure or frame. After the ramp is pivoted to the upwardly inclined position, as shown in FIG. 2, through the action of the counterbalancing spring 4, the operator will walk outwardly on the ramp and the weight of the operator in combination with the weight of the ramp will overcome the force of the spring assembly 4, thereby pivoting the ramp downwardly. Downward movement of the ramp relative to the latch bar 33 will cause the links 27 to pivot forwardly, thereby moving the rod 25 forwardly to pivot the lug 23 and move the lip toward the extended position. As the ramp continues to be walked down, the links 27 and rod 25 will be moved to an in-line or on-center position, as shown in FIG. 3, and in this position of the toggle mechanism, the lip is at an extended position just short of the fully extended position.

Continued downward movement of the ramp will move the links 27 and rod 25 beyond the on-center position, and engagement of the ends of the latch pin 32 with the forward edges of the brackets 31 serve as a stop to limit the pivotal movement of the links 27. As the links and rod move into the over-center position, the roller 29 will engage the undersurface of the latch bar 33 to lift the bar and move the notch 35 out of engagement with the latch pin 32.

Further downward movement of the ramp will bring the lip into engagement with the truck bed. When the lip moves into engagement with the truck bed, the lip will pivot to its fully extended position, and the weight of the lip will be removed from the rod 25, with the result that the links 27 will pivot downwardly by gravity to break the toggle. When the truck moves away from the dock, the lip 19 will then be free to pivot downwardly to the penant position.

In accordance with the invention, the dockboard includes an improved mechanism for returning the ramp to the dock level position in the event the ramp is at a below dock level position when the truck pulls away from the dock after the loading or unloading operation is completed. The return-to-dock-level mechanism includes an arm 37 having a U-shaped member 38 secured to its upper end, and the arm 37 and U-member 38 are pivoted to brackets 31 on ramp 3 by pin 39. The lower end of arm 37 is pivotally connected to the central portion of an operating link 40 and integral U-member 41 by pin 42. The upper end of the link 40 is secured to the chain 14 of the holddown mechanism 7 through S-clips 43.

Projecting outwardly from the lower end of the link 40 is a pin 44 and if the ramp moves to a below dock level position with the lip extended, the pin 44 will move to a position ahead of a stop plate 45 which extends upwardly from the supporting structure 2, as will be hereinafter described in greater detail.

A spring 46 is connected between the link 40 and a pin 48 on the rod 25. As the rod 25 moves forwardly to pivot the lip to the extended position, the spring 46 will pivot the arm 37 forwardly to move the link 40 to a forward position.

OPERATION

In the cross traffic position of the dockboard, as shown in FIG. 1, the lip 19 is in the pendant position and the toggle members 25 and 27 will be in the broken position. The operating link 40 which is connected to the holddown chain 14 is in an upwardly and forwardly inclined position with the pin 44 being a substantial distance to the rear of the stop plate 45.

To move the ramp to the upwardly inclined position, as shown in FIG. 2, the operator pulls upwardly on the loop 17 which releases the holddown mechanism 7 through pull on the chain 14. With the holddown mechanism released, the counterbalancing spring assembly 4 will pivot the ramp to the upwardly inclined position, as shown in FIG. 2. In this position, the lip 19 is still in the pendant position and the toggle members 25 and 27 are in the broken position and the arm 37 and link 40 are in a position similar to that of FIG. 1.

The operator then walks outwardly on the ramp and the combined weight of the ramp and the operator will overcome the force of the spring assembly 4, thereby moving the ramp downwardly. As the ramp is walked downwardly, the notch 35 of the latch bar 33 will engage the latch pin 32, and continued downward movement of the ramp will thereby pivot the toggle members 25 and 27 toward the on center position to pivot the lip outwardly. As the toggle members 25 and 27 move toward the on-center position, the forward movement of the rod 25 will pull the arm 40 forwardly through the spring 46, to a position where the pin 44 is located forwardly of the stop bar 45.

Continued downward movement of the ramp, will move the links 27 and rod 25 beyond the on-center position, to an over-center position. When the toggle moves to over-center, the weight of the lip 19 acting rearwardly through the rod 25 will tend to pivot the links 27 counterclockwise to a more over-center position and engagement of the ends of the latch pin 32 with the forward edges of the brackets 31 serves as a stop to limit the counterclockwise pivotal movement of the links 27. As the links and the rod move into the over-center position, the roller 29 will engage the undersurface of the latch bar 33, to lift the bar and move the notch 35 out of engagement with the latch pin 32. Even though the latch pin 32 is released from engagement with notch 35, the weight of the lip 19 acting through rod 25 will maintain the toggle in the over-center position.

As the ramp is walked down further, the lip 19 will engage the bed of a truck or carrier located in front of the dock. In a situation where the truck bed is above dock level, engagement of the lip with the truck bed will move the lip to the fully extended position, thereby removing the weight of the lip from the rod 25. With the weight of the lip removed from the rod 25, the toggle members 25 and 27 will fall by gravity to the broken position, and due to the fact that pin 44 is positioned above the level of stop 45, the arm 37 and link 40 will both return to their original position, as shown in FIG. 1. When the truck pulls away from the dock, the lip will then swing downwardly in its pendant position and the ramp, which is at an above dock level position, can be walked downwardly by the operator to the cross traffic or dock level position.

Figure 4:
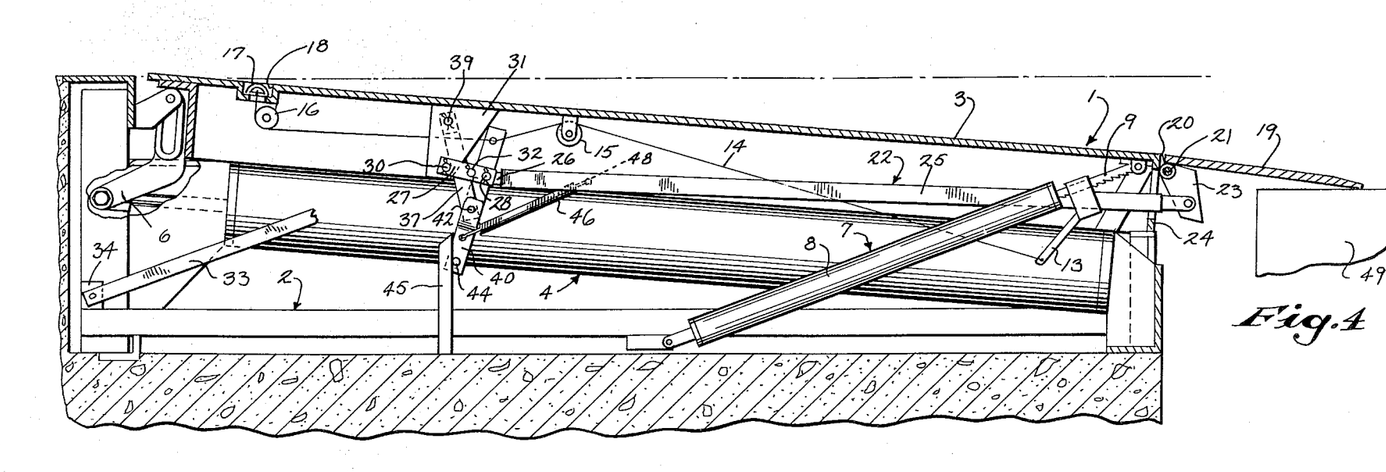
FIG. 4 is a view similar to FIG. 1, showing the lip in the fully extended position and engaged with a truck bed and with the ramp in a below dock level position.
Figure 5:
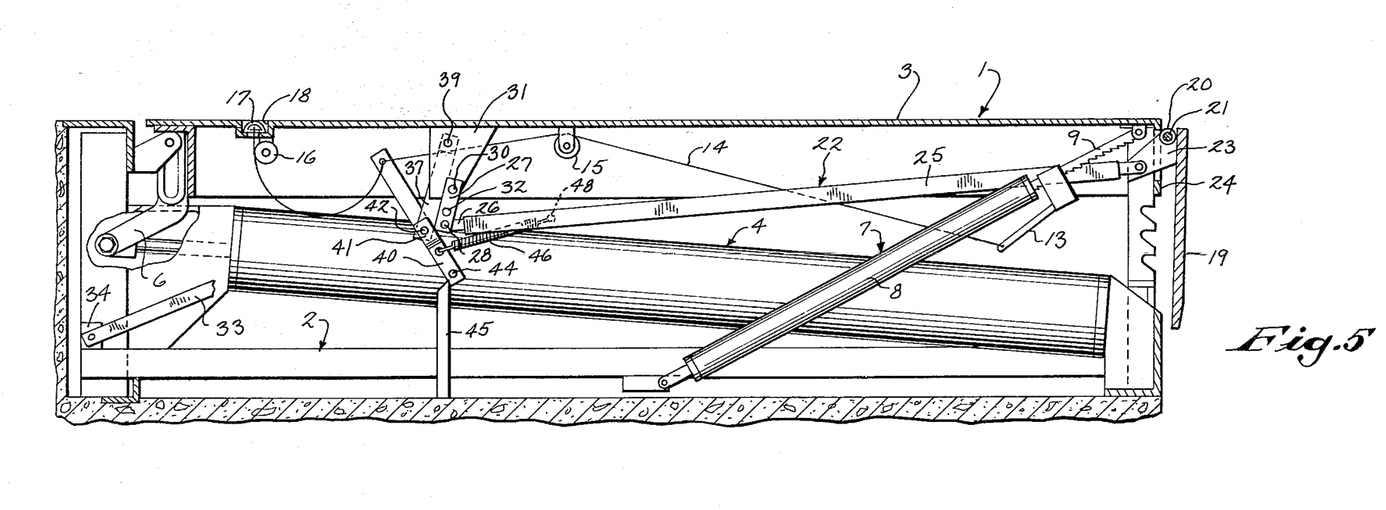
FIG. 5 is a view similar to FIG. 1, showing the lip in the pendant position after the truck pulls away from the dock and the holddown mechanism released.

If, however, the truck bed 49 is below dock level, the downward movement of the ramp to the below dock level position will cause the pin 44 to move forwardly of the stop 45, as shown in FIG. 4, and engagement or latching of the pin 44 with the stop 45 will prevent free return of the link 40 to its original position, as shown in FIG. 1. When the lip engages the truck bed 49, which is located below dock level, the weight of the lip will be removed from the rod 25, causing the rod 25 and links 27 to move to a partially broken position, as shown in FIG. 4. When the loading operation is completed and the truck pulls away from the dock, the lip will fall downwardly by gravity thereby moving the rod 25 to the rear and engagement of the pin 32 with the forward edge of the arm 37 will pivot the arm 37 rearwardly. As the lower end of the link 40 is latched to the frame 2 due to the engagement of pin 44 with stop 45, rearward pivotal movement of arm 37 will cause the upper end of link 40 to pivot to the rear, pulling the chain 14 to the rear and thereby releasing the holddown mechanism 7 and enabling the ramp to raise, through the counterbalancing spring assembly 4. When the ramp rises to a position approximately at dock level, the pin 44 will ride over the top of the stop 45 thereby enabling the lower end of the link 40 to pivot to the rear to release the pull on the chain 14 and again lock the holddown mechanism to prevent further elevation of the ramp. Thus, the lip lifting mechanism and the return-to-dock-level mechanism will automatically return to the position shown in FIG. 1.

The return to dock level mechanism will automatically raise the ramp to a cross traffic or dock level position if the ramp is at a below dock level position when the truck pulls away from the loading dock. This prevents any obstruction to cross traffic movement that can result in a situation where the ramp reamins at a below dock level position.

While the description has shown the lip being moved to its extended position as a consequence of the ramp being moved downwardly from the elevated position toward the cross traffic position, it is contemplated that the return-to-dock-level mechanism can be associated with a dockboard having a lip lifting mechanism that raises the lip as a consequence of upward movement of the ramp.

Various modes of carrying out the invention are contemplated as being within the scope of the following claims particularly pointing out and distinctly claiming the subject matter which is regarded as the invention.

I claim:

1. A dockboard, comprising a supporting structure, a ramp hinged at its rear end of the supporting structure, a lip hinged to the forward edge of the ramp and movable between a downwardly hanging pendant position and an outwardly extending position where the lip forms an extension to the ramp, ramp lifting means operably connected to the ramp for pivoting the ramp upwardly from a horizontal position to an upwardly inclined position, releasible holding means interconnecting the ramp and the supporting structure for preventing upward movement of said ramp unless released but permitting free downward movement of the ramp, said holding means including a flexible operating cable, lip lifting means operably connected to the lip for moving the lip from the pendant position to the extended position, an operating member pivotally carried by the ramp and secured to said operating cable, operating means operably connected to the operating member and responsive to the ramp being at a below dock level position and responsive to the lip moving from the extended position toward the pendant position for pivoting said operating member in a direction to exert a force on said cable to release said holding means and enable the ramp lifting means to elevate the ramp, and means responsive to a predetermined elevation of the ramp from said below dock level position for deactivating said operating means and re-engaging the holding means to stop upward movement of the ramp.

2. The dockboard of claim 1, and including actuating means responsive to downward movement of the ramp from an upwardly inclined position toward a horizontal position for actuating said lip lifting means to move the lip from the pendant position to the extended position.

3. The dockboard of claim 2, wherein said lip lifting means comprises a pair of interconnected toggle members, one of said toggle members being pivotally connected to the ramp and the other of said toggle members being engageable with the lip, said actuating means disposed to move the toggle members toward a locked position in consequence of downward movement of the ramp to thereby move the lip from the pendant position toward the extended position.

4. A dockboard, comprising a supporting structure, a ramp hinged at its rear end to the supporting structure, a lip hinged to the forward edge of the ramp and movable between a downwardly hanging pendant position and an outwardly extending position where the lip forms an extension to the ramp, ramp lifting means operably connected to the ramp for pivoting the ramp upwardly from a horizontal position to an upwardly inclined position, releasible holding means interconnecting the supporting structure and the ramp for preventing upward movement of said ramp unless released but permitting free downward movement of the ramp, lip lifting means operably connected to the lip for moving the lip from the pendant position to the extended position, an operating link operably connected to said holding means, mounting means for mounting the link for movement with respect to the ramp, a first latch member connected to said link, a second latch member connected to the supporting structure, means operably connected to said link and operable as a consequence of the lip being moved from the pendant position to the extended position for moving the first latch member to a position such that downward movement of the ramp to a below dock level position will effect engagement of said latch member, means operably connected to said link and responsive to the ramp being at a below dock level position and operable as a consequence of the lip moving from the extended position toward the pendant position for pivoting said operating link about the engaged latch members to thereby exert a force on said holding means and release the holding means and enable the ramp to move upwardly, and means responsive to a predetermined upward movement of the ramp from said below dock level position to disengage said first and second latch members and thereby re-engage said holding means to lock the ramp at said predetermined elevation.

5. The dockboard of claim 4, wherein said mounting means comprises a second link pivotally connected to the ramp and pivotally connected to said first link.

6. The dockboard of claim 5, wherein said means operable as a consequence of the lip being moved from the pendant position to the extended position comprises a connecting member interconnecting the lip lifting means and one of said links.

7. The dockboard of claim 6, wherein said connecting member is connected between the lip lifting means and said second link.

8. The dockboard of claim 6, wherein said connecting member is a spring.

9. The dockboard of claim 4, wherein said first latch member is a projection on said operating link and said second latch member is an abutment on said supporting structure.

10. The dockboard of claim 9, wherein said abutment comprises a generally vertical plate.

11. The dockboard of claim 10, wherein the height of said plate is arranged relative to the position of said projection, such that the projection will be located at the upper end of the plate when the ramp is at a generally horizontal position.

12. The dockboard of claim 4, wherein said holding means includes a manually operable cable, said operating link being connected to said cable.

13. A dockboard, comprising a supporting structure, a ramp hinged at its rear end to the supporting structure, a lip hinged to the forward edge of the ramp and movable between a downwardly hanging pendant position and an outwardly extending position where the lip forms an extension to the ramp, ramp lifting means operably connected to the ramp for pivoting the ramp upwardly from a horizontal position to an upwardly inclined position, releasible holding means operably interconnecting the ramp and the supporting structure for preventing upward movement of said ramp unless released but permitting free downward movement of the ramp, lip lifting means operably connected to the lip for moving the lip from the pendant position to the extended position, a first link operably connected to said holding means, a second link pivotally connected to the first link and pivoted to said ramp, a projection on said first link, abutment means mounted on the supporting structure, first operating means operably connected to said first link and operable as a consequence of the lip being moved from the pendant position toward the extended position for moving the projection to a position such that subsequent downward movement of the ramp to a below dock level position will effect engagement of said projection with said abutment means, second operating means operably connected to said first link and responsive to the ramp being at a below dock level position and operable as a consequence of the lip moving from the extended position toward the pendant position for pivoting said first link about the position of engagement of said projection with said abutment means to thereby exert a force on said holding means and release said holding means and enable the ramp to move upwardly, and means responsive to upward movement of the ramp from said below dock level position to a predetermined elevation to disengage said projection from said abutment means and thereby re-engage said holding means to lock the ramp at said predetermined elevation.

14. The dockboard of claim 13, wherein said holding means includes a flexible cable extending to the upper surface of the ramp, said first link being secured to said cable.

15. A dockboard, comprising a supporting structure, a ramp hinged at its rear end to the supporting structure, a lip hinged to the forward edge of the ramp and movable between a downwardly hanging pendant position and an outwardly extending position where the lip forms an extension to the ramp, ramp lifting means operably connected to said ramp for pivoting the ramp upwardly from a horizontal position to an upwardly inclined position, releasable holding means operably interconnecting the supporting structure and the ramp for preventing upward movement of said ramp unless released but permitting free downward movement of the ramp, lip lifting means operably connected to the lip for moving the lip from the pendant position to the extended position, means operably connected to the lip lifting means and responsive to downward movement of the ramp from the upwardly inclined position toward the horizontal position for actuating said lip lifting means to move the lip from the pendant position toward the extended position, an operating member movably mounted on the ramp and operably connected to said holding means, operating means operably connected to said operating member and responsive to the ramp being at a below dock level position and operable as a consequence of the lip moving from the extended position toward the pendant position for moving said operating member relative to the ramp in a first direction to exert a force on said holding means to release said holding means and enable the ramp lifting means to elevate the ramp, and means operably connected to said operating member and responsive to a predetermined elevation of the ramp from said below dock level position for moving said operating member relative to the ramp in a second direction to release the force on said holding means to thereby re-engage the holding means and stop upward movement of the ramp.

16. The dockboard of claim 15, wherein said lip lifting means includes a toggle assembly interconnecting the ramp and the lip and movable between an unloaded position and a locked position, said operating means also including means for moving the toggle assembly from the unlocked position to the locked position on downward movement of the ramp to thereby move the lip from the pendant position toward the extended position.

17. The dockboard of claim 16, wherein said means for moving said toggle assembly includes a connecting member connecting said toggle assembly with said operating member, movement of the lip from the extended position toward the pendant position acting to move the toggle assembly to the unlocked position to thereby exert a force through said connecting member to move said operating member in said first direction.

* * * * *

UNITED STATES PATENT AND TRADEMARK OFFICE
CERTIFICATE OF CORRECTION

PATENT NO. : 3,967,337
DATED : July 6, 1976
INVENTOR(S) : THOMAS G. ARTZBERGER

It is certified that error appears in the above—identified patent and that said Letters Patent are hereby corrected as shown below:

Column 3, lin e 7, Cancel "2" and substitute therefor ---3---, Column 4, line 9, After "which" insert ---is---, Column 6, line 25, Cancel "in" and substitute therefor ---to---, Column 7, line 12, Cancel "of" and substitute therefor ---to---, Column 8, line 9, Cancel "member" and substitute therefor ---members---.

Signed and Sealed this

Twelfth Day of October 1976

[SEAL]

Attest:

RUTH C. MASON
Attesting Officer

C. MARSHALL DANN
Commissioner of Patents and Trademarks